June 21, 1927.   1,632,830
J. R. GAMMETER
MOLDING AND VULCANIZING APPARATUS
Filed Aug. 12, 1925   3 Sheets-Sheet 1
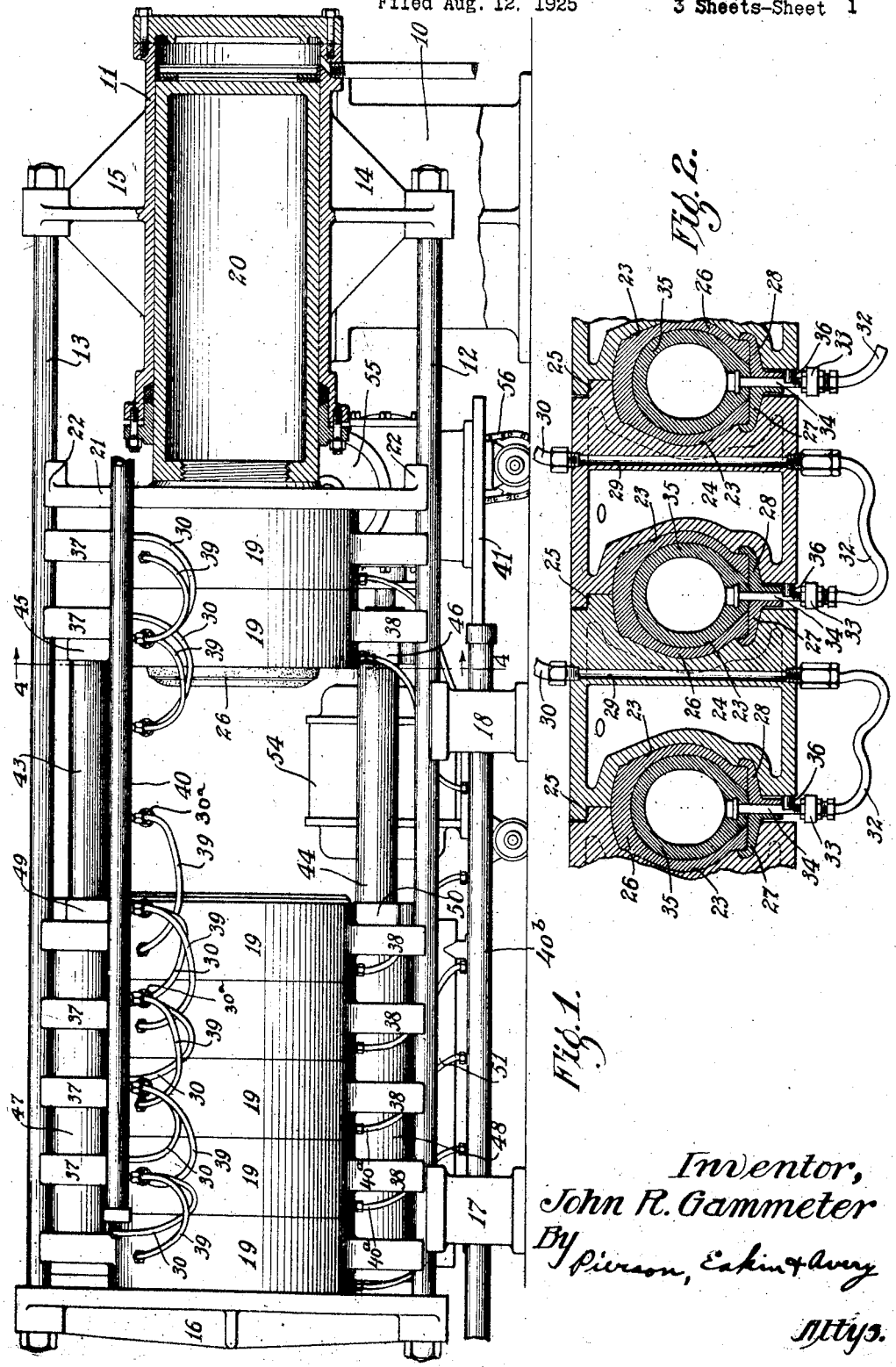
Inventor,
John R. Gammeter
By Pierson, Eakin & Avery
Attys.

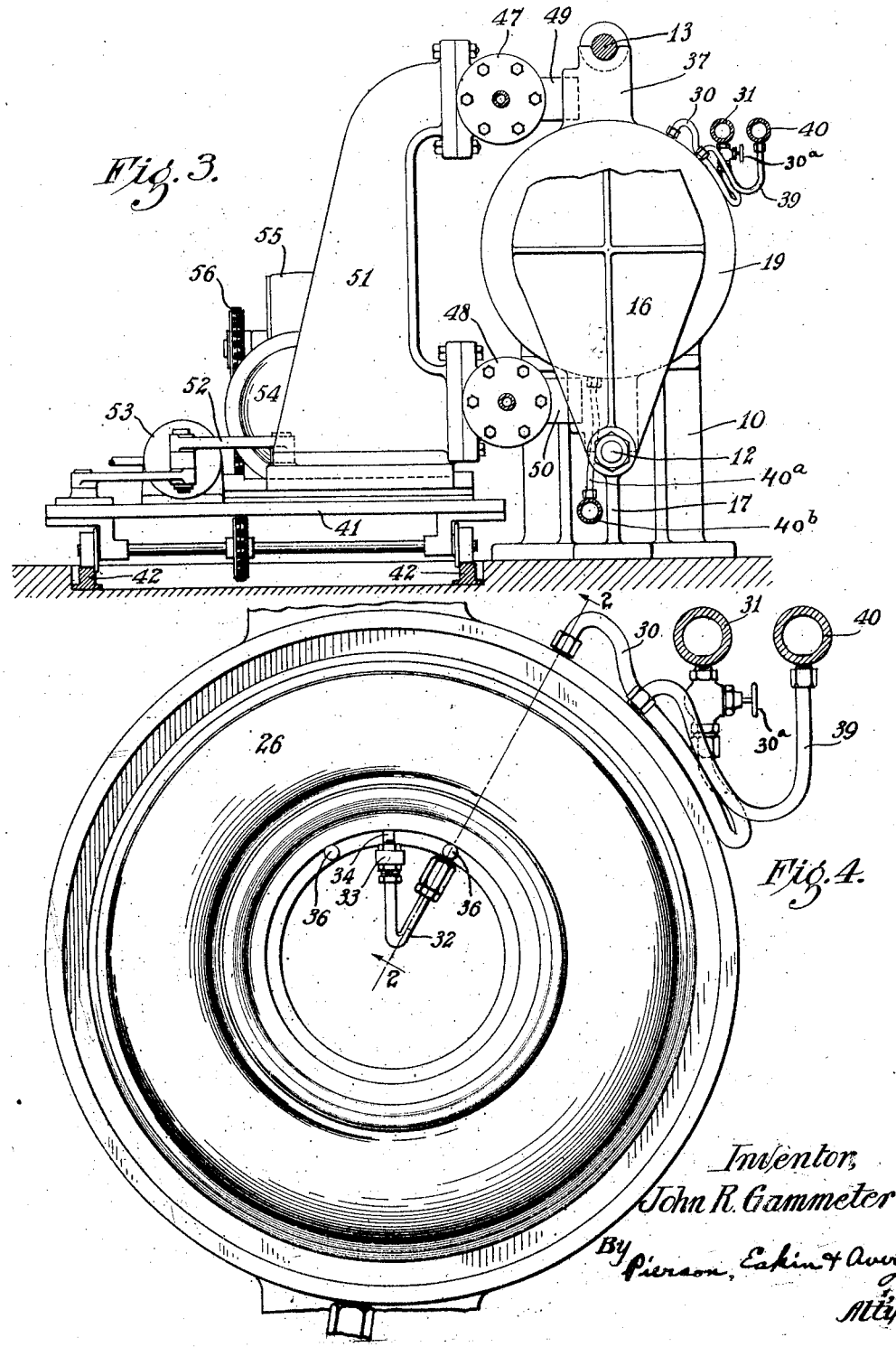

June 21, 1927.
J. R. GAMMETER
1,632,830
MOLDING AND VULCANIZING APPARATUS
Filed Aug. 12, 1925  3 Sheets-Sheet 3
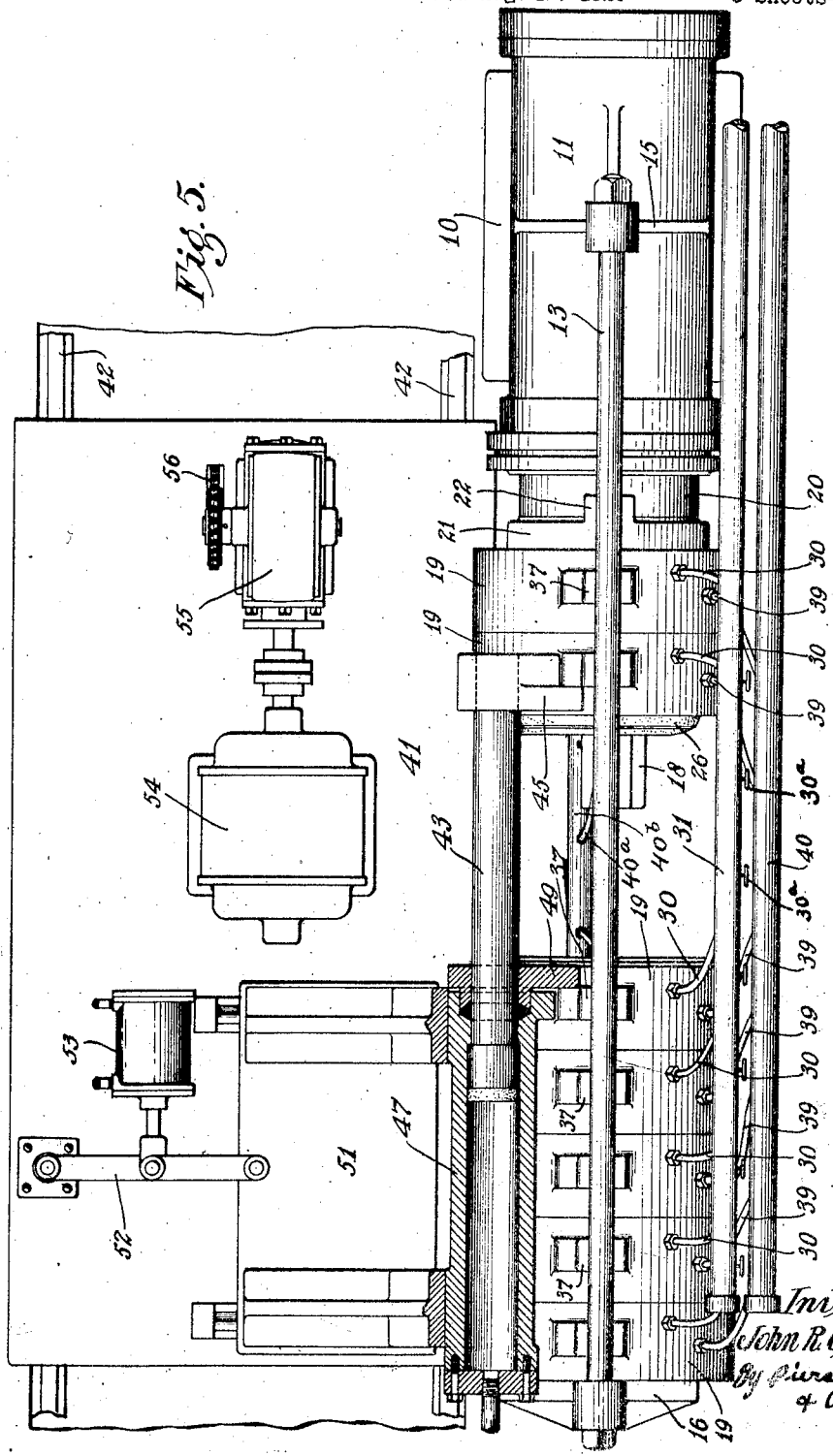
Inventor,
John R. Gammeter
By Pierson, Eakin
& Avery
Attys.

Patented June 21, 1927.

1,632,330

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

MOLDING AND VULCANIZING APPARATUS.

Application filed August 12, 1925. Serial No. 49,740.

This invention relates to the art of molding, as in the vulcanizing of annular articles such as tires or inner tubes, and its chief object is to provide improved molding and vulcanizing apparatus including tire molds adapted to be kept continuously at vulcanizing temperature and having advantages such as economy and facility in the mounting and removal of the articles to be vulcanized. Further objects are economy of floor space and conservation of heat.

Of the accompanying drawings:

Fig. 1 is a side elevation of the preferred embodiment of my invention.

Fig. 2 is a fragmentary, longitudinal section of some of the mold members, on line 2—2 of Fig. 4.

Fig. 3 is an end elevation of the apparatus, parts being sectioned and broken away.

Fig. 4 is a vertical section of parts of the apparatus on line 4—4 of Fig. 1, showing in elevation the body portion of one of the mold members, with a tire therein.

Fig. 5 is a plan view of the apparatus, a part of the same being shown in section.

Referring to the drawings, the apparatus comprises a standard 10 supporting a ram cylinder 11 and a horizontal guide frame comprising a pair of guide rails, 12, 13, which are secured at one end to brackets 14, 15, formed on the ram cylinder 11 and secured at the other end to a cross head 16, the guide frame being supported by standards 17, 18, upon which the lower guide rail 12 is seated, and also by the attachment of the guide rails 12, 13, to the ram cylinder brackets 14, 15.

The cross head 16 is adapted to be abutted by the adjacent terminal member of a set of mold members 19, 19, which are slidably mounted between the guide rails 12, 13. A ram 20 mounted in the cylinder 11 is provided with a head 21 adapted to abut the adjacent terminal member of the set of mold members 19, and is formed with guide shoes 22, 22, slidably fitting the adjacent sides of the guide rails 12, 13.

Each of the mold members in the embodiment here shown is formed with a tire receiving cavity 23 on each of its opposite faces and with a steam chamber 24 between the tire cavities, and is rabbeted as indicated at 25 to interfit in accurate registry with adjacent mold members, so that adjacent faces of contiguous mold members define a complete molding cavity for a tire 26, here shown as being of the pneumatic type, although my invention is not wholly limited thereto.

The mold members are adapted to interfit with the usual bead clamping rings 27, 28. Each mold member is traversed by a fluid passage 29 from its outer to its inner periphery. The outer end of said passage is connected by a flexible pipe 30, provided with a stop-cock 30ª, with a manifold pipe 31 extending along the set of mold members and supported by suitable means (not shown). The inner end of each fluid passage 29 has connected therewith a flexible pipe 32 (Figs. 2 and 4) which is provided at at its other end with a quick-detachable coupling 33 for connection with the inlet stem 34 of an expansible core 35 within the tire 26.

Each of the mold members has projecting from one side thereof in its upper region a pair of studs 36, 36, adapted to engage the inner periphery of the bead clamping ring 28 to support the tire assembly and guide it into proper position in the mold member in the mounting of the tire therein.

The mold members are each guided upon the rails 12, 13, by guiding ears or shoes 37, 38, projecting from their outer peripheries and slidably fitting the guide rails, the mold members being supported by the lower rail 12. As the supporting and guiding means for the mold members are at their outer peripheries, outside the circle of the tire cavity, the tires may be freely mounted in the tire cavities and removed therefrom while the mold members remain upon the guide rails and without the disengagement of any connections.

The steam cavities 24 in the several mold members are connected by respective flexible pipes 39, 39, with a manifold steam pipe 40 extending along the set of mold members and supported by suitable means (not shown), and the lowermost region of each is connected by a flexible pipe 40ª with an outlet manifold 40ᵇ for venting water of condensation.

For forcing adjacent mold members of the set apart selectively to remove a cured tire therefrom and mount an uncured tire therein, while maintaining the mold-closing force of the ram 20 upon the other mold members and continuing the vulcanization of tires therein, a carriage 41 is mounted upon rails 42, 42, (Fig. 3) for movement along the set of mold members and has mounted thereon a pair of rams 43, 44, (Figs. 1 and 5) provided at their outer ends with offset heads 45, 46. The ram cylinders 47, 48, have offset heads 49, 50, projecting latterly from their ends adjacent the ram heads, the heads 45 and 49 being adapted to be moved together between adjacent guide shoes 37 of the mold members, and the heads 46, 50, being adapted to be moved together between adjacent guide shoes 38 of the mold members, when a slide 51, mounted for transverse movement upon the carriage 41 and constituting the support for the ram cylinders, is moved toward the set of mold members. The cylinders are thus adapted, upon being charged, to actuate the rams 43, 44, and thereby to force apart the mold members with which the offset ram and cylinder heads are engaged, as shown in Figs. 1 and 5, against the force of the ram 20.

A toggle 52 connects the slide 51 with the carriage 41 (Figs. 3 and 5) and is adapted to be actuated by a fluid pressure cylinder 53 to move the slide 51 and the mold-opening devices carried thereby toward and from the set of molding members, to interlock the mold-opening heads with the mold members, or to retract them therefrom to permit the carriage to be moved to operative position with relation to other mold members of the set.

For so moving the carriage a motor 54 is mounted thereon and connected through a reduction gear 55 and a sprocket chain 56 with the drive-wheel axle of the carriage.

In the operation of the appartus the tire assemblies, each including the tire 26, the expansible core 35 therein, and the bead clamping-rings 27, 28, are mounted in alternation with the mold members and the inlet stems 34 are connected up with the respective flexible pipes 32, the mounting of the tires preferably proceeding from one end of the set of mold members to the other, and the set of molds being continuously heated and held in closed relation by the ram 20 while the initial filling of the set of molds is accomplished, so that the tire first mounted begins to be vulcanized promptly upon being mounted, and the successive mold cavities being opened one after another in this operation by means of the rams 43, 44.

When the mounting of the several tires has been completed and when the first mounted tire has been completely vulcanized, the tires are successively removed in the same order in which they were mounted. As each completely vulcanized tire is removed, it is replaced by an uncured tire.

Thus each mold cavity is held out of vulcanizing service only for such time as is required to remove one tire and mount another, and economy of mold equipment is effected.

As the mold members abut each other and substantially eliminate radiation of heat except from their outer peripheries, and as no cooling down of the mold members is required, a substantial conservation of heat is obtained, as compared with either the pot-heater type of vulcanizer or the usual steam-jacketed vulcanizing mold.

Floor space is economized by reason of the close assembly of a large number of mold members, the necessity of operating space individual to each mold, for mounting and removing the tire, being eliminated.

The mold-guiding means being outside of the tire cavity circle, the tires may be freely inserted between and removed from the mold members.

An even pressure of the mold members toward each other, determined by the yielding force of the ram 20, is constantly maintained, which is especially desirable when the tires are of such size and character as to require softening of the rubber before the mold members are fully closed thereon.

The mold members themselves are manipulated entirely by power-operated means, the only substantial manual exertion required being that of mounting and removing the tire assemblies.

Modifications may be resorted to without departing from the scope of my invention and I do not wholly limit my claims to the specific construction shown.

I claim:

1. Apparatus for molding annular articles, said apparatus comprising a set of mold members for concurrently molding a plurality of the articles, guiding means, on mold members of the set, outside the mold cavity circle, guiding means adapted to coact with the first said guiding means to guide the mold members into abutted relation, yielding means engaging a terminal member of the set for impelling the mold members, and means engaging mold members of the set outside the mold cavity circle for separating them against the force of the said yielding means, the separating means comprising a carriage movable along the set of mold members and mold-opening means on said carriage.

2. Apparatus as defined in claim 1 in which each of the mold members is formed with a steam cavity therein and with mold cavities on opposite faces thereof.

3. Molding apparatus comprising a mounting for a horizontal series of mold members, a set of mold members mounted thereon, the mold members being adapted to be moved thereon with relation to each other into and out of abutted relation, and power-operated means for so moving them, the means for moving the mold members out of abutted relation comprising a carriage mounted for movement along the set of mold members and means on said carriage adapted to be inserted between adjacent mold members for spreading the same apart.

In witness whereof I have hereunto set my hand this 31st day of July, 1925.

JOHN R. GAMMETER.